June 18, 1968  R. J. HUNDHAUSEN  3,389,041
DECORATIVE WEAR-RESISTANT PANEL
Filed Nov. 14, 1966  3 Sheets—Sheet 1
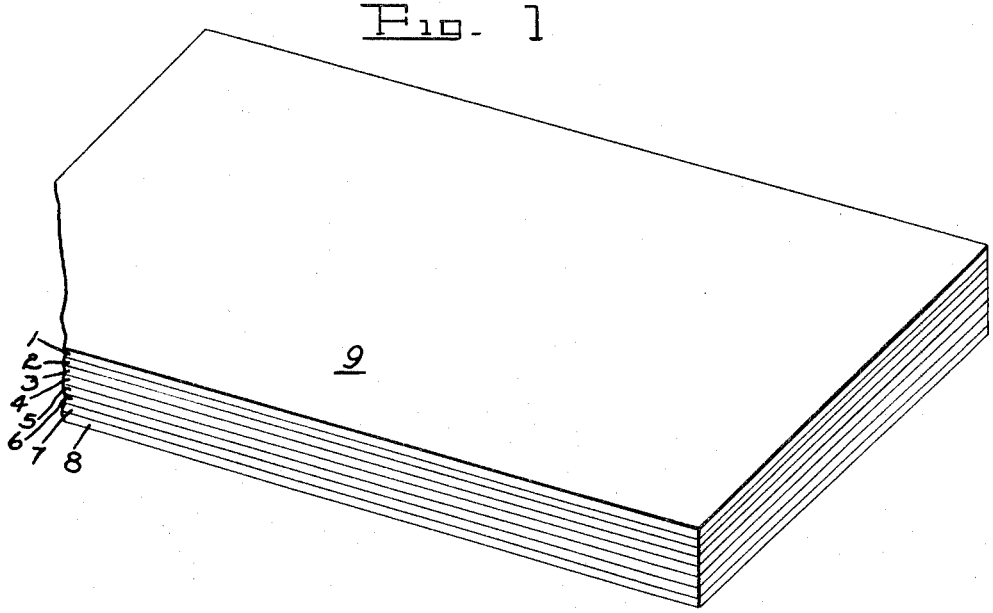
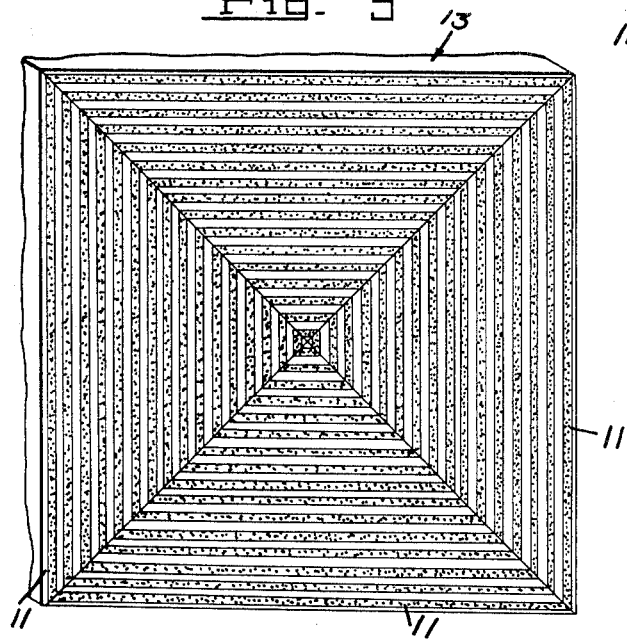
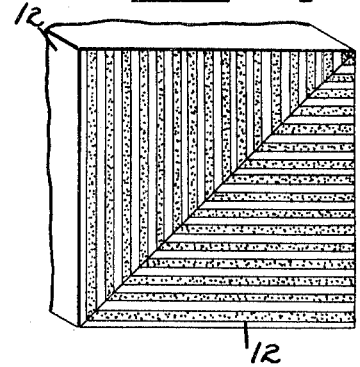
INVENTOR.
ROBERT J. HUNDHAUSEN
BY
ATTYS.

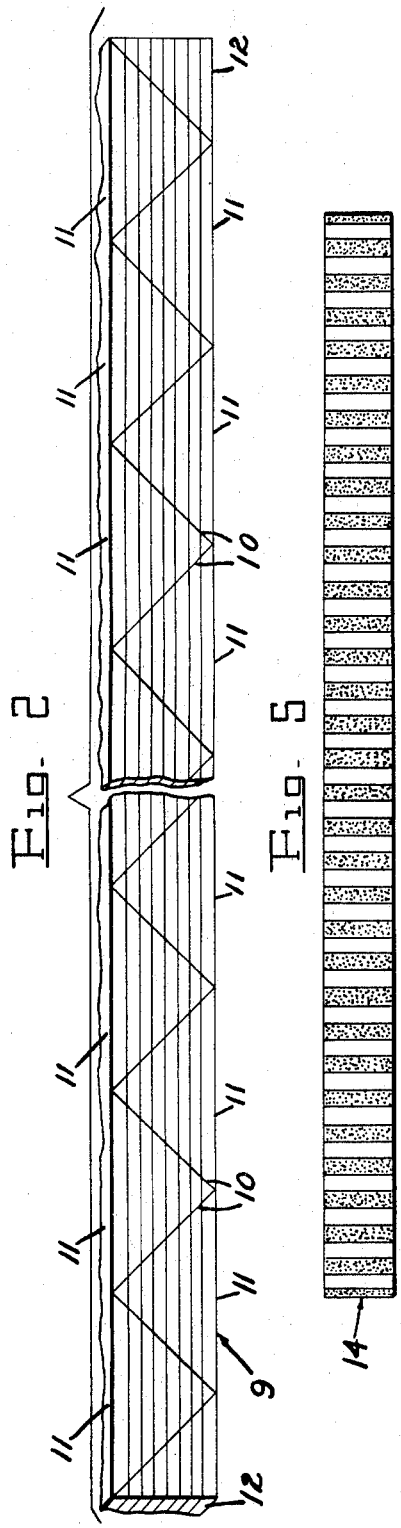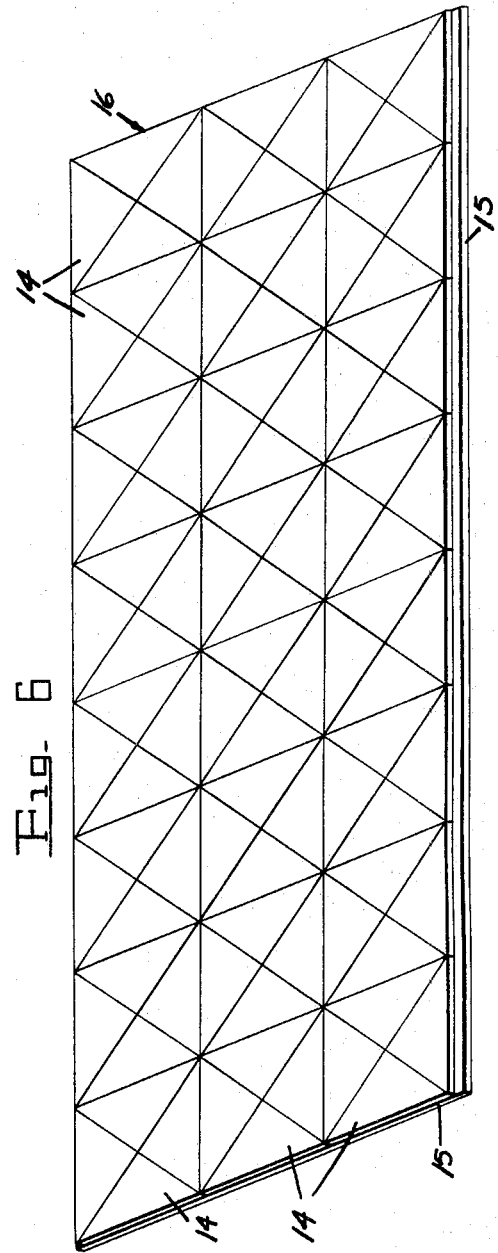

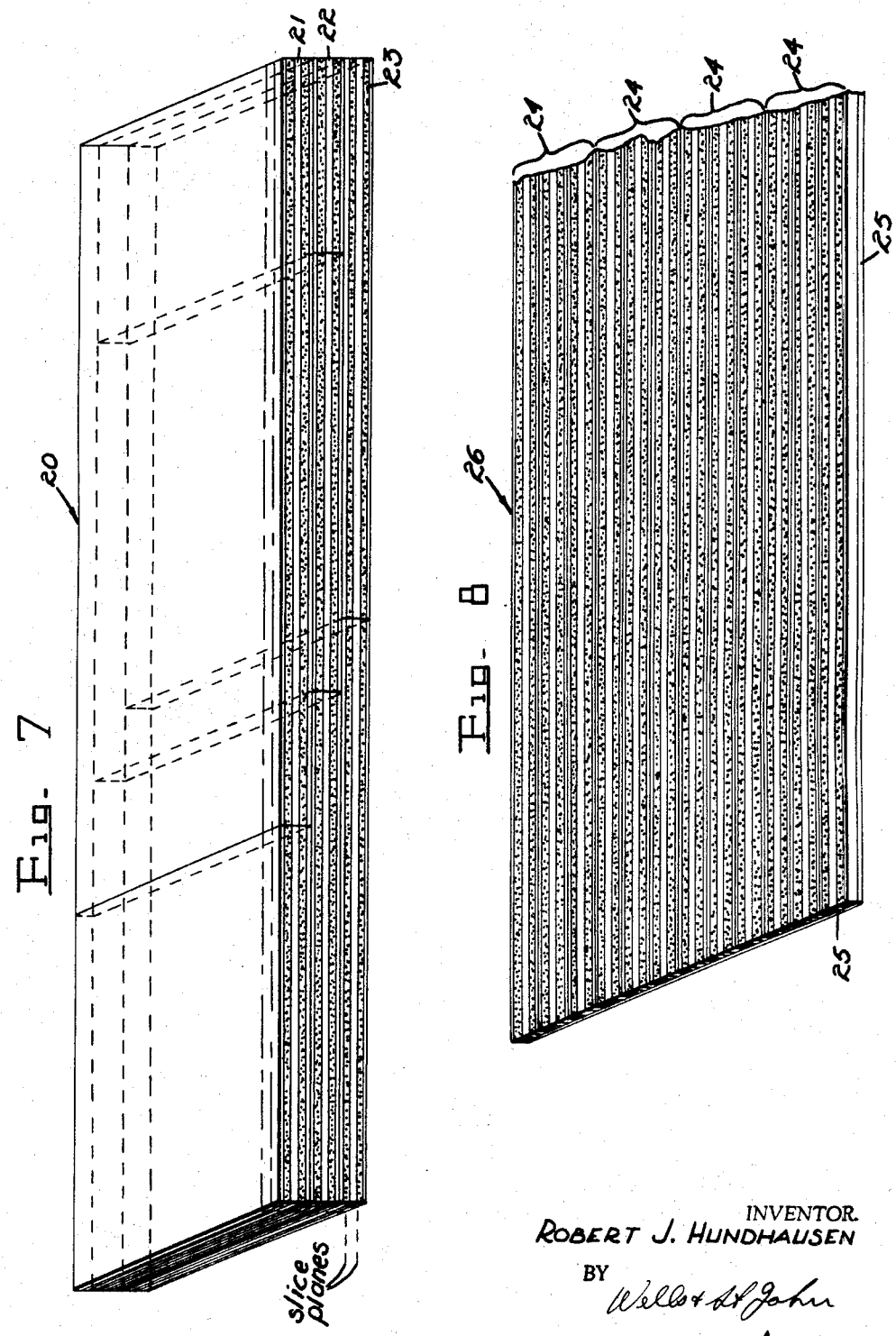

United States Patent Office 3,389,041
Patented June 18, 1968

3,389,041
DECORATIVE WEAR-RESISTANT PANEL
Robert J. Hundhausen, Rte. 2, Box 32,
Hayden Lake, Idaho 83835
Continuation-in-part of application Ser. No. 325,630,
Nov. 22, 1963. This application Nov. 14, 1966, Ser.
No. 602,438
2 Claims. (Cl. 161—37)

ABSTRACT OF THE DISCLOSURE

The patent disclosure describes embodiments of my invention concerning a decorative surface panel that is wear resistant and is formed by thin wafers 14 mounted on a backing board 15 in which each wafer 14 is composed of alternating end-grain and side-grain bands. The wafers 14 are constructed by laminating commercially available plywood sheets to a desired thickness to form an assembly 9. The assembly 9 is then cut to form smaller elongated blocks 11 having a right angle isosceles triangular cross section. Four of the blocks 11 are then bonded together to form a square elongated block 13 having a cross-sectional pattern of concentric square rings with alternating end-grain and side-grain bands. The block 13 is then sliced into thin wafers 14 to be mounted in a desired pattern on the backing board 15.

---

This is a continuation-in-part application of my co-pending application Ser. No. 325,630, filed Nov. 22, 1963.

My invention relates to a new and useful decorative wood material wherein the base material used is commercial plywood and scrap plywood, and the resulting product can be provided in large size panels to more fully expedite the laying of finished floors, walls and ceilings.

Commercial plywood is used throughout the building industry as a backing or base material such as sub-flooring. However, wherever it is subject to surface wear, it is far from satisfactory because it splinters easily and does not wear well.

One object of my invention is to provide a surface panel whereby plywood is converted into a wear resistant product that is also of a decorative appearance suitable for use as flooring and wall and ceiling panels without additional surfacing being necessary. In a preferred embodiment, the final product is a relatively large size panel that can be easily laid.

It is also a purpose of my invention to provide a decorative wear resistant surfacing material wherein the exposed surface is composed of alternating end-grain and side-grain bands in which the grain surface exposes the hard and soft layers of the wood. The construction of the surface panel is accomplished by laminating commercial plywood sheets to a desired thickness to form an assembly, then first cutting this assembly into smaller elongated blocks of like cross section such as triangular, square, etc., then cross-cutting these blocks into thin wafers and mounting the wafers edge to edge upon a base sheet of plywood or other backing.

The nature and advantages of my invention will appear more fully from the following description and the accompanying drawings which illustrate the preferred embodiment.

In the drawings:

FIGURE 1 is a perspective view illustrating an assembly of commercial plywood sheets adhered together in a first step of making the surface panel;

FIGURE 2 is a side view of the assembly after it is cut to shaped blocks;

FIGURES 3 and 4 are fragmentary perspective views of two or more blocks bonded together;

FIGURE 5 is an enlarged side view of a wafer cut from one of the blocks of FIGURE 3;

FIGURE 6 is a perspective view illustrating the assembly of the wafers of FIGURE 5 upon a backing to form a surface panel;

FIGURE 7 is a perspective view illustrating a modification of the invention whereby long bars of the surfacing material may be made up from shorter pieces of commercial plywood; and FIGURE 8 is a perspective view showing wafers cut from the bars of FIGURE 7 assembled upon a backing sheet.

In the construction of my invention, I may use commercial plywood sheets three-fourths inch thick (five ply) and of a standard width such as 4 feet wide and 8 feet long. As shown in FIGURE 1, I use eight such sheets and surface glue them together to make an assembly 9 that is 6 inches thick. Well known procedures and presses like those used in making the original plywood sheets may be used to press and cure the adhesive used to secure the several sheets to each other. The individual plywood sheets are numbered 1 to 8 in FIGURE 1.

After the assembly 9 is completed, it is cut along the lines 10 indicated in FIGURE 2 to produce fifteen 4-foot long blocks 11 that are, in cross-section, right angle isosceles triangles with a 12-inch base and 6-inch height. Also there are two corner blocks 12 that are right angle isosceles triangles with the two sides that are set at right angles to each other, each 6-inches long. The drawings show the end grain surface stippled to distinguish it from the edge grain surface.

The several blocks 11 are next assembled in groups of four pieces and secured to each other with adhesive to form blocks 13 that are 12-inches by 12-inches in cross section and 4-feet long. These blocks 13 are next sliced to form thin wafers 14 that are a foot square. These wafers are like tile and can be laid individually if desired in a suitable mastic to make a flooring. However, I prefer to mount them in the manner illustrated in FIGURE 6, so that each wafer has a decorative and wear resistant surface with a concentric square ring pattern having alternating end grain and side grain bands.

In FIGURE 6 a backing sheet 15 is utilized to mount a multiplicity of the wafers 14. The size of the backing sheet 15 depends upon the need. Preferably I use a quarter inch or thicker plywood backing sheet 15 that is 4-feet by 8-feet, and I adhere the wafers 14 to this sheet using a suitable adhesive and pressure. The backing sheet is preferably slightly oversize to allow for final trimming to exact size. These panels 16 of several wafers 14 may be made upon any suitable kind of backing sheet that will enable the panel to be handled as a unit. Other suitable backing materials are fiber board, flakeboard, sheets of fiber glass, reinforced plastic, etc.

The smaller blocks 12 can be assembled as shown in FIGURE 4 or in other patterns as desired and sliced into wafers in the same manner as the blocks 11. These wafers may also be placed on backing sheets in the same manner as the wafers 14. Thus the main waste is in the small amount lost as dust in the cutting.

In the modification illustrated in FIGURES 7 and 8 there is shown border and trim panels made from a similar construction. In this modification, a series of plywood sheets 21, 22 and 23 of varying dimensions are laid up to produce a long panel assembly 20 which, for example, may be 16-feet long. The number of sheets laid one upon the other will determine the thickness. For example, as shown, there are three layers of three-fourth inch plywood making a depth of two and three-fourth inches. The several laminations are united by adhesive and pressure curing. Next the panel is cut lengthwise into thin wafers 24. These wafers are mounted upon a backing sheet 25 by adhesive to produce a composite panel 26 as shown in FIGURE 8. The number of wafers 24 laid on a backing sheet 25 will determine the width.

The panels 16 and 26 are sanded and finished with any suitable preserving and coating material such as varnish, lacquer, plastic resin, shellac or wax. The resulting product exposes a surface that is highly wear resistant because fifty percent or more of the product has end grain exposed. The remainder of the surface has the side grain surface similar to that of quarter-sawn flooring, that is, with the hard and soft layers of the wood alternating. This is in direct contrast to the normal plywood surface where there is no end grain exposed, and large areas of facing grain in which the soft layers of the wood are exposed. The appearance of the surface is similar to inlaid wood, but the cost of production and laying is very low. The sizes and shapes of the wafers 14 can be varied greatly as will be evident. For example, by using only six sheets of three-quarter inch plywood to make the assembly 9 and cutting in the same way, one would obtain wafers 14 that are 9-inches square. The triangular blocks 12 can be assembled in pairs to make 6-inch squares or in fours to make larger squares. Where different species of wood are used in the surface layers and the interior layers of wood, varied color combinations are produced.

It is customary in making commercial plywood to use surface layers that are about half the thickness of the intermediate layers. My invention takes advantage of this characteristic in combining the sheets, because the adhesive that bonds two sheets of plywood to each other is between two of the thin surface layers. I have found that this adhesive line is almost invisible in the finished wafers so that the appearance is of layers of essentially equal width except at the outer edges of the wafers.

The panels 26 can, by cutting proper lengths with 45 degree angle ends, be laid up to produce a large square on a floor with an appearance like one of the wafers 14. Many other combinations of the wafers from the blocks 11 and 12 can be made to produce a variety of attractive designs.

The variety of wafer sizes and surface designs that may be obtained as described above are all obtainable without changing the intent and scope of the invention as set out in the objects and particularly defined in the claims. It is believed to be obvious that the assemblies 9 and 20 can be built up of scrap, i.e., less than standard length and width, pieces of plywood with only the minimum loss occasioned in trimming to obtain accurate end and side edge joints where the smaller pieces meet in the assembly. It should be noted that whether the assemblies are cut into wafers indicated in FIGURES 3 and 4 or cut in wafers indicated in FIGURE 8, the wear surface is made up of narrow alternating strips of end grain and side grain exposures to provide maximum wear resistance.

The nature and advantages of my invention are believed to be apparent from the foregoing description. The steps by which commercial plywood and sub-size scrap pieces thereof are converted into highly wear resistant and decorative surfacing panels are simple and may be economically performed. It is only necessary to adhere a multiplicity of sheets of plywood one upon the other, then to cut the solid assembly so formed into wafers and to adhere the wafers together upon a backing sheet. The cutting is done in connection with the grain of the wood so as to be always transverse to the planes of the naturally formed, hard and soft layers in the wood.

Having described my invention, I claim:
1. A decorative wear resistant flooring comprising:
 (a) a structural backing board; and
 (b) a plurality of wafers bonded to and substantially covering one surface of the backing board, each of said wafers comprising four bonded isosceles triangular blocks of laminated plywood sheets sliced transversely to the planes of the plywood sheets and bonded together to form a wafer pattern of concentric rectangular rings of alternating end-grain and side-grain bands.
2. A decorative wear resistant flooring as defined in claim 1 wherein the blocks are right angle isosceles triangles and the wafer pattern is a concentric square ring of alternating end-grain and side-grain bands.

References Cited
UNITED STATES PATENTS

| | | | |
|---|---|---|---|
| 220,893 | 10/1893 | Westcost | 144—314 |
| 235,799 | 12/1880 | Naylor | 144—314 |
| 947,001 | 1/1910 | Kertscher | 144—316 |
| 1,324,954 | 12/1919 | Carpenter | 144—319 |
| 1,921,184 | 8/1933 | Hartzell | 152—250 |
| 2,104,307 | 1/1938 | Miller | 144—314 |
| 3,205,111 | 9/1965 | Williamson et al. | 156—250 |
| 3,216,468 | 11/1965 | Allan | 156—250 |

DOUGLAS J. DRUMMOND, *Primary Examiner.*